3,410,704
DENTURE ADHESIVE CONSISTING OF
PECTIN AND AGAR
Charles E. Beachner, Santa Barbara, Calif.
(1651 Funston Ave., San Francisco, Calif. 94122)
No Drawing. Filed Apr. 20, 1966, Ser. No. 543,803
2 Claims. (Cl. 106—35)

ABSTRACT OF THE DISCLOSURE

This invention is directed to a denture adhesive which is compatible with conditions in the human mouth such as taste and odor with physiological benefits and with it the necessary mechanical benefits of cushioning and adhesion, at all times during use. The powder is a finely comminuted mixture of agar and pure pectin in the range of and between 1 part by weight of agar to 2 parts by weight of pectin and 1 part by weight of agar and 10 parts by weight of pectin. In the tube dispensing form gelatin and agar is mixed with powdered pectin in substantially the proportions given above.

---

This invention relates generally to denture adhesive compositions, and, more particularly, to a new denture adhesive powder having improved mechanical and physiological properties.

A great variety of denture adhesive compositions have been developed in the past. Many, if not the majority, of the prior denture adhesive powders, however, are not totally satisfactory for the reason that they possess certain adverse mechanical and/or physiological properties. Some of these adverse properties of the prior denture adhesives are insufficient adhesive strength, unpleasing or offensive taste or odor, excessive frequency and difficulty of application, poor cushioning characteristics, and lack of antibacterial and other physiologically beneficial action.

Certain of these properties result from the fact that many of the prior denture adhesives utilize gum karaya, imported from India, as their adhesive base. Such gum karaya, while it exhibits satisfactory adhesive strength, has a number of undesirable characteristics which render it unsuitable for oral use as a denture adhesive. Gum karaya, for example, has quite an offensive odor and unpleasing taste. Moreover, when used as a denture adhesive, gum karaya is processed to a finely divided state which resists the degree of wetting required to develop its proper adhesive strength. Apparently, this is due to the fact that in the normal finely divided state of the gum, each individual particle is enveloped in a film of air which clings tenaciously to the particle. Such particle-enveloping air films provide highly effective liquid barriers about the particles which strongly resist both penetration of a liquid, such as water, into the inter-particle spaces and wetting contact of the liquid with the particles. This resistance to wetting of the existing gum karaya based denture adhesives and other finely divided denture adhesive powders renders difficult proper use of the adhesives.

It is a principal object of the present invention to provide an improved denture adhesive composition, or denture adhesive powder, which avoids the above noted and other deficiencies of the existing adhesives, particularly those which utilize gum karaya as their adhesive base.

A more specific object of the invention is to provide an improved denture adhesive consisting of pectin and agar combined in predetermined proportions which have been found to yield a denture adhesive with superior mechanical and physiological properties.

Another object of the invention is to provide an improved denture adhesive of the composition described which mixes readily with water, exhibits optimum adhesive strength and cushioning characteristics, possesses a pleasing taste and smell, produces certain anti-bacterial and other physiologically beneficial actions, is easy to apply, economical to produce, and utilizes domestically available ingredients.

As noted above, the invention provides an improved denture adhesive composition consisting of pectin and agar combined in predetermined proportions which afford the adhesive with superior mechanical and physiological characteristics. By way of illustration, it has been found that the optimum proportions (by weight) of these ingredients are one part agar to six parts pectin. However, it has been further determined that satisfactory adhesive compositions according to the invention result from combining these ingredients within the range of proportions of one part agar to two parts pectin at one extreme to one part agar to ten parts pectin at the other extreme.

In the interest of conveying a more thorough understanding of the invention and a better appreciation of the superior properties and characteristics of the present denture adhesive, it is desirable to discuss, briefly, the ingredients of the adhesive, even though these ingredients, and their respective mechanical and physiological properties and characteristics are well known. In the present denture adhesive, the pectin serves as the primary adhesive base. Pectins are purified carbohydrate products, consisting chiefly of partially methoxylated polygalacturonic acids. They are obtained from the dilute acid extract of the inner portions of the rind of citrus fruits. In solution, pectins form a natural hydrophilic colloid and present an enormous surface area composed of ultramicroscopic particles, or micelles as they are called, that exhibit strong attractive forces. This activity of physical attraction of the particles or micelles, which may be related to electrical charges on the micelles, afford pectins with excellent adhesive properties and with a capability of adsorbing toxins and other substances. In addition, pectins exhibit antibacterial and certain other physiologically beneficial actions or functions which are well known. Another advantage of pectins, related to their present use in a denture adhesive, resides in the fact that they are not hydrolyzed by salivary enzymes. It is obvious at this point, therefore, that the above noted properties of pectins render the latter particularly suitable for oral use.

As noted earlier, one of the unsuitable properties of the gum karaya which is employed as the adhesive base in many of the prior denture adhesives resides in its unpleasing or offensive taste and odor. In this connection, a distinct beneficial property of pectins, relative to their use in denture adhesives, is the fact that they are odorless and tasteless in their purified form.

Because of the excellent adhesive properties of pectins and their other beneficial properties, noted above, which are particularly suitable in denture adhesives, it would appear that pure pectin might provide an ideal denture adhesive composition. However, pure pectin has been found to be unsuitable for use as a denture adhesive. The reason for this is pure pectin exists in a finely divided state. As discussed above, a material in such a finely divided state resists wetting of its particles by a liquid, such as water, owing to the existence of tenacious air films which envelope the individual particles. Accordingly, it was found that wetting of pure pectin to the degree required to develop its proper adhesive properties was both difficult and time consuming. Moreover, a denture adhesive consisting of pure pectin exhibits only a slight cushioning action, substantially less than that necessary for a satisfactory denture adhesive.

According to the present invention, the above properties of pure pectin which preclude its use as a dental adhesive are avoided by combining agar with the pectin. The agar serves two functions. First, it promotes rapid and thorough wetting of the pectin particles, thus permitting the dental adhesive to rapidly develop its optimum adhesive properties. Secondly, the agar provides a cushioning action between the dental plate to which the adhesive is applied and the wall of the mouth.

Agar is a gelatinous product which is extracted, by a boiling process, from algae, particularly of the Gelidium species, and from Ceylon moss. After boiling, the agar is cooled, purified, and dried in the form of granules or flakes. The present denture adhesive is produced by combining particulate pectin and granular agar in the proper proportions and thoroughly agitating or stirring the resulting powder-like mass to effect generally homogenous intermixing of the pectin and agar.

The denture adhesive powder is applied by sprinkling it onto the wetted surface of a denture plate. The agar rapidly absorbs water from the plate and is thereby converted into a gelatinous mass. During this conversion of the agar from its initial granular state to its final gelatinous state, the agar expands or swells to provide an effective cushion between the wall of the mouth and the denture plate when the latter is positioned in the mouth. Moreover, during its conversion to the gelatinous state, the agar, in effect, strips and expells the air films from about the pectin particles and simultaneous envelops the particles in water, thereby effecting rapid and thorough wetting of these particles. This wetting of the pectin particles converts the pectin into an extremely efficient adhesive which firmly anchors the denture plate to the wall of the mouth. Actually, the gelatinous agar also exhibits slight adhesive properties. However, as already noted, the pectin provides the primary adhesive base of the present denture adhesive and the agar serves primarily to achieve rapid wetting of the pectin particles and provide a cushioning action.

As discussed earlier, the optimum proportions of pectin and agar in the present denture adhesive are one part of agar to six parts of pectin. However, completely satisfactory denture adhesives according to the invention have been produced by combining the agar and pectin in various other proportions. Increasing the proportion of agar in the composition has the effect of weakening the adhesive strength of the composition. On the other hand, increasing the proportion of pectin in the composition has the effect of increasing the resistance of the composition to wetting of the pectin particles. Accordingly, it has been determined that the limiting proportions of agar and pectin which will yield a satisfactory denture adhesive according to the invention are one part agar to two parts pectin and one part agar to ten parts pectin.

While the instant invention has been shown and described herein in what is conceived to be the most practical and preferred embodiment, it is recognized that departures may be made therefrom in the scope of the invention, which is therefore not to be limited to the details disclosed herein, but is to be afforded the full scope of the claims.

What is claimed is:

1. A dry powdered denture adhesive composition consisting essentially of thoroughly intermixed purified and dry agar and pure pectin in proportions by weight falling within the range of 1 part agar to 2 parts pectin and 1 part agar to 10 parts pectin.

2. A denture adhesive according to claim 1 wherein:
said agar and pectin are combined in the approximate proportions by weight of one part agar to six parts pectin.

References Cited

UNITED STATES PATENTS

| 2,272,723 | 2/1942 | Noyes | 106—205 |
| 2,701,212 | 2/1955 | Brennan | 106—208 |
| 2,139,139 | 12/1938 | Tompkins | 167—55 |

OTHER REFERENCES

Whistler Industrial Gums, 1959, pp. 29–31 and 43, 44.

JULIUS FROME, *Primary Examiner.*

T. MORRIS, *Assistant Examiner.*